United States Patent
Lent et al.

(10) Patent No.: US 9,026,495 B1
(45) Date of Patent: May 5, 2015

(54) SYSTEM AND METHOD FOR CREATING AND ACCESSING A HOST-ACCESSIBLE STORAGE ENTITY

(75) Inventors: Arthur F. Lent, Newton, MA (US); Rebecca Beaman, Reading, MA (US); Vitaly Revsin, Andover, MA (US); Don Bolinger, Concord, MA (US); Salimah Addetia, Cambridge, MA (US); Randall Smith, Arlington, MA (US); Hooman Vassef, Arlington, MA (US)

(73) Assignee: NetApp, Inc., Sunnyvale, CA (US)

( * ) Notice: Subject to any disclaimer, the term of this patent is extended or adjusted under 35 U.S.C. 154(b) by 1333 days.

(21) Appl. No.: 11/442,437

(22) Filed: May 26, 2006

(51) Int. Cl.
*G06F 17/30* (2006.01)
*G06F 12/12* (2006.01)

(52) U.S. Cl.
CPC ...................................... *G06F 12/12* (2013.01)

(58) Field of Classification Search
None
See application file for complete search history.

(56) References Cited

U.S. PATENT DOCUMENTS

| | | |
|---|---|---|
| 4,570,217 A | 2/1986 | Allen et al. |
| 5,124,987 A | 6/1992 | Milligan et al. |
| 5,129,088 A | 7/1992 | Auslander et al. |
| 5,155,835 A | 10/1992 | Belsan |
| 5,163,131 A | 11/1992 | Row et al. |
| 5,202,979 A | 4/1993 | Hillis et al. |
| 5,278,979 A | 1/1994 | Foster et al. |
| 5,403,667 A | 4/1995 | Simoens |
| 5,426,747 A | 6/1995 | Weinreb et al. |
| 5,581,724 A | 12/1996 | Belsan et al. |
| 5,819,292 A | 10/1998 | Hitz et al. |
| 5,963,962 A | 10/1999 | Hitz et al. |
| 6,061,770 A | 5/2000 | Franklin |
| 6,081,875 A | 6/2000 | Clifton et al. |
| 6,260,120 B1 * | 7/2001 | Blumenau et al. ............. 711/152 |
| 6,324,654 B1 * | 11/2001 | Wahl et al. ........................ 714/6 |
| 6,341,341 B1 | 1/2002 | Grummon et al. |
| 7,127,577 B2 | 10/2006 | Koning et al. |
| 7,409,494 B2 | 8/2008 | Edwards et al. |
| 2003/0105767 A1* | 6/2003 | Sonoda et al. ................. 707/100 |
| 2003/0233518 A1* | 12/2003 | Yamagami et al. ........... 711/114 |
| 2004/0030668 A1 | 2/2004 | Pawlowski et al. |

(Continued)

OTHER PUBLICATIONS

Author: Barry Mellish, Philippe Jachimczyk, Sean Crawford, Craig McKenna, Robert Symons. Title: IBM TotalStorage: Introducing the SAN Volume Controller and SAN Integration Server;Date: Jul. 2003;Publisher: IBM;Edition: 1st Edition;Pertinent pp. 1-11 (renumbered).*

(Continued)

*Primary Examiner* — Anh Tai Tran
(74) *Attorney, Agent, or Firm* — Cesari and Mckenna, LLP

(57) ABSTRACT

The present invention provides a system and method for creating and accessing a copy of one or more host-accessible storage entities contained in a persistent consistency point image (PCPI) of a volume served by a storage system. The storage entity may comprise a file system, logical volume, volume group, or "file system on raw device". The copy of the storage entity is generated using a logical unit number (lun) copying technique in conjunction with a PCPI table of contents (PTOC). The PTOC contains data describing contents of the PCPI, including luns of the storage entity. The PTOC is written to the volume of the storage system, which is configured to store the luns, i.e., in the context of an active file system, immediately prior to generation of the PCPI. After generation of the PCPI, the PTOC is deleted from the volume such that it is only stored within the PCPI and not within the active file system.

33 Claims, 11 Drawing Sheets

(56) References Cited

U.S. PATENT DOCUMENTS

| | | | |
|---|---|---|---|
| 2004/0054866 A1* | 3/2004 | Blumenau et al. | 711/202 |
| 2004/0250033 A1* | 12/2004 | Prahlad et al. | 711/162 |
| 2005/0177594 A1 | 8/2005 | Gupta et al. | |
| 2006/0010154 A1* | 1/2006 | Prahlad et al. | 707/102 |
| 2006/0155748 A1* | 7/2006 | Zhang et al. | 707/102 |
| 2006/0230086 A1* | 10/2006 | Devarakonda et al. | 707/205 |
| 2007/0055833 A1* | 3/2007 | Vu et al. | 711/162 |
| 2007/0088702 A1 | 4/2007 | Fridella et al. | |

OTHER PUBLICATIONS

Author: Veritas; Title: Veritas NetBackup 6.0 System Administrator's Guide for Unix and Linux; Date: Sep. 2005; Publisher: Veritas; vol. I; Pertinent pp. 465-536 (of attached pdf file).*
Akyurek, Sedat, *Placing Replicated Data to Reduce Seek Delays*, Department of Computer Science, University of Maryland, UMICAS-TR-91-121, CS-TR-2746, Aug. 1991.
Bitton, Dina, *Disk Shadowing*, Proceedings of the 14$^{th}$ VLDB Conference, LA, CA 1988.
Chaudhuri, Surajit, et al., *Self-Tuning Technology in Microsoft SQL Server*, Data Engineering Journal 22, 2 1999 pp. 20-27.
Chutani, Sailesh, et al., *The Episode File System*, In Proceedings of the USENIX Winter 1992.
Coyne, Robert A., et al., *Storage Systems for National Information Assets*, Proc. Supercomputing 92, Minneapolis, Nov. 1992, pp. 626-633.
Finlayson, Ross S., et al., *Log Files: An Extended File Service Exploiting Write-Once Storage* Department of Computer Science, Stanford University, Report No. STAN-CS-87-1177, Sep. 1987.
Gray, Jim, et al., *The Recovery Manager of the System R Database Manager*, ACM Computing Surveys, (13)2:223-242 1981.
Hecht, Matthew S., et al., *Shadowed Management of Free Disk Pages with a Linked List*, ACM Transactions on Database Systems, 8/4, Dec. 1983, pp. 503-514.
Howard, John, H. et al., *Scale and Performance in a Distributed File System*, Carnegie Mellon University, CMU-ITC-87-068, Aug. 1987.
Howard, John H., *An Overview of the Andrew File System*, Carnegie Mellon University, CMU-ITC-88-062 1988.
Howard, John, H. et al., *Scale and Performance in a Distributed File System*, ACM Trans. Computer System, 6(1), Feb. 1988 pp. 51-81.
Kazar, Michael Leon, *Synchronization and Caching Issues in the Andrew File System*, Carnegie Mellon University, CMU-ITC-88-063.
Kazar, Michael L., et al., *DEcorum File System Architectural Overview*, USENIX Summer Conference, Anaheim, California, 1990.
Kemper, Alfons, et al., *Performance Tuning for SAP R/3*, Data Engineering Journal 22, 2 1999 pp. 33-40.
Kent, Jack et al., *Optimizing Shadow Recovery Algorithms*, IEEE Transactions on Software Engineering, 14(2): 155-168, Feb. 1988.
Kistler, et al., *Disconnected Operation in the Coda File System*, ACM Transactions on Computer Systems, vol. 10, No. 1, Feb. 1992, pp. 3-25.
Lorie, Raymond, A. *Physical Integrity in a Large Segmented Database*, ACM Trans. Database Syst., vol. 2, Mar. 1977, pp. 91-104.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.
Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.
Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 Sep. 1988.
Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.
Quinlan, Sean, *A Cached WORM File System*, Software-Practice and Experience, 21(12):1289-1299 1991.
Rosenblum, Mendel, et al., *The LFS Storage Manager*, Computer Science Division, Electrical Engineering and Computer Sciences, Univ. of CA, presented at Summer '90 USENIX Technical Conference, Anaheim, CA Jun. 1990.
Rosenblum, Mendel, et al. *The Design and Implementation of a Log-Structured File System* Jul. 24, 1991 pp. 1-15.
Rosenblum, Mendel, *The Design and Implementation of a Log-Structured File System*, 1992 pp. 1-93.
Rosenblum, Mendel, et al., *The Design and Implementation of a Log-Structured File System*, In Proceedings of ACM Transactions on Computer Systems, (10)1:26-52, Feb. 1992.
Schiefer, Berni, et al., *DB2 Universal Database Performance Tuning*, Data Engineering Journal 22, 2 1999 pp. 12-19.
Seltzer, Margo I. et al., *Journaling Versus Soft Updates: Asynchronous Meta-Data Protection in File Systems*, Proceedings of 200 USENIX Annual Technical Conference, Jun. 18-23, 2003.
Shasha, Dennis, *Tuning Time Series Queries in Finance: Case Studies and Recommendations*, Data Engineering Journal 22, 2 1999 pp. 41-47.
Sidebotham, Bob, *Volumes: The Andrew File System Data Structuring Primitive*, EEUG Conference Proceedings, Manchester, UK, Autumn 1986.
Subramanian, Muralidhar, et al., *Performance Challenges in Object-Relational DBMSs*, Data Engineering Journal 22, 2 1999 pp. 28-32.
Weikum, Gerhard, et al.., *Towards Self-Tuning Memory Management for Data Servers*, Data Engineering Journal 22, 2 1999 pp. 3-11.
West, Michael, et al. *The ITC Distributed File System: Prototype and Experience*, Carnegie-Mellon University, Technical Report CMU-ITC-040, Mar. 1985.
Zayas, Edward R., AFS-3 Programmer's Reference: Architectural Overview, Transarc Corporation, Pittsburgh, PA, 1.0 edition 1991.
Callaghan, B., "NFS Version 3 Protocol Specification", Request for Comments (RFC) 1813 Jun. 1995, 118 pages.
Hitz, Dave et al., File System Design for an NFS File Server Appliance, Technical Report 3002, Rev. C395, presented Jan. 19, 1994, 23 pages.
Performance Without Compromise: The Virtual Storage Architecture 1997, 11 pages.

* cited by examiner

| | |
|---|---|
| PTOC VERSION | _810_ |
| PTOC PROGRAM | _812_ |
| PCPI NAME | _813_ |
| TIMESTAMP | _814_ |
| HOST NAME | _816_ |
| OS TYPE | _818_ |
| OS VERSION | _820_ |
| OS RELEASE | _822_ |
| VM NAME | _824_ |
| VM VERSION | _826_ |
| VOLUME GROUP NAME | _828_ |
| VOLUME GROUP ID | _830_ |
| LUN LIST | _832_ |
| VOLUME GROUP CONFIGURATION | _834_ |
| HOST VOLUME | _836_ |
| HOST VOLUME NAME | _838_ |
| FILE SYSTEM | _840_ |
| FILE SYSTEM TYPE | _842_ |
| FILE SYSTEM MOUNT POINT | _844_ |
| FILE SYSTEM OPTIONS | _846_ |
| LUN NAME | _848_ |
| FILE SYSTEM | _850_ |
| FILE SYSTEM TYPE | _852_ |
| FILE SYSTEM MOUNT POINT | _854_ |
| FILE SYSTEM OPTIONS | _856_ |
| LUN INFORMATION | _858_ |
| LUN NAME | _860_ |
| LUN SERIAL NUMBER | _862_ |
| STORAGE SYSTEM NAME | _864_ |
| STORAGE SYSTEM VOLUME NAME | _866_ |
| PATH LIST | _868_ |
| ⋮ | _870_ |

GENERAL INFORMATION 802: PTOC VERSION through OS RELEASE

VOLUME GROUP 804: VM NAME through FILE SYSTEM OPTIONS 846

RAW DISK 806: LUN NAME 848 through PATH LIST 868

SYSTEM AND METHOD FOR CREATING AND ACCESSING A HOST-ACCESSIBLE STORAGE ENTITY

BACKGROUND OF THE INVENTION

Field of the Invention

The present invention relates to storage systems and, in particular, to flexibly creating and accessing a copy of host-accessible storage entities in a storage system persistent consistency point image (PCPI) or set of storage system PCPIs.

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored. As used herein a file is defined to be any logical storage container that contains a fixed or variable amount of data storage space, and that may be allocated storage out of a larger pool of available data storage space. As such, the term file, as used herein and unless the context otherwise dictates, can also mean a container, object or any other storage entity that does not correspond directly to a set of fixed data storage devices. A file system is, generally, a computer system for managing such files, including the allocation of fixed storage space to store files on a temporary basis.

As used herein, a storage entity can be a file system, logical volume, volume group, or "file system on raw device". A volume group is a set of luns aggregated to provide a storage space that may be utilized by the client to overlay one or more file systems or other structured storage thereon. A logical volume is a collection of physical partitions organized into logical partitions all contained in a single volume group. "File system on raw device" is a file system created directly on a raw device, e.g., a raw lun, where a raw lun is not under the control of a volume manager.

The file server, or storage system, may be further configured to operate according to a client/server model of information delivery to thereby allow many client systems (clients) to access shared resources, such as files, stored on the storage system. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the storage system. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (lun).

Certain storage systems may support multi-protocol access and, to that end, enable clients to access data via both block and file-level requests. One example of such a storage system is described in U.S. patent application Ser. No. 10/215,917, entitled MULI-PROTOCOL STORAGE APPLIANCE THAT PROVIDES INTEGRATED SUPPORT FOR FILE AND BLOCK ACCESS PROTOCOLS, by Brian Pawlowski et al., which was published as U.S. Patent Publication No. 2004/0030668 A1 on Feb. 12, 2004.

Some known file systems contain the capability to generate a snapshot of the file system. In the example of a Write Anywhere File Layout (WAFL®) based file system, snapshots are described in *TR3002 File System Design for a NFS File Server Appliance* by David Hitz, et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., which are hereby incorporated by reference.

"Snapshot" is a trademark of Network Appliance, Inc. It is used for purposes of this patent to designate a persistent consistency point (CP) image. A persistent consistency point image (PCPI) is a point-in-time representation of a data container stored on one or more storage devices (e.g., on disk) or in other persistent memory and having a name or other identifier that distinguishes it from other PCPIs taken at other points in time. A PCPI can also include other information (metadata) about the data container at the particular point in time for which the image is taken. The terms "PCPI" and "snapshot" shall be used interchangeably throughout this patent without derogation of Network Appliance's trademark rights.

One common use for a storage system that supports block-based protocols is to export one or more data containers, such as logical unit numbers (luns), for use by a volume manager executing on a host or client. The volume manager typically forms the data containers into one or more volume (or disk) groups. As noted, a volume group is a set of luns aggregated (by the volume manager) to provide a storage space that may be utilized by the client to overlay one or more file systems or other structured storage thereon. As used herein, the term storage space means storage managed by a volume manager that utilizes one or more data containers hosted by one or more storage systems. One example of a storage space is a file system overlaid onto a volume group that comprises one or more luns stored within a plurality of volumes of a single storage system or within a plurality of volume of a plurality of storage systems. Another example of a storage space is a volume group managed by a volume manager to enable an application, such as a database application, to store structured data thereon.

By utilizing a storage system to host the luns providing a storage space, the underlying data availability and protection features of the storage system's file system may be utilized with the storage space. One such feature is the ability to generate a PCPI of a volume storing the luns associated with a host-accessible storage entity, such as a volume group. The PCPI can then be used to copy the luns for purposes of, e.g., creating a second, backup copy of the data. However, a known technique for copying and accessing a PCPI served by a storage system operates on only a single lun and not with any other form of "multiple lun" storage entity. Thus, a noted problem arises when a client desires to create and access a copy of the host-accessible storage entity comprising a plurality of luns contained in the PCPI.

SUMMARY OF THE INVENTION

The present invention overcomes the disadvantages of the prior art by providing a system and method for creating and accessing a copy of one or more host-accessible storage entities contained in a persistent consistency point image (PCPI) of a volume served by a storage system. The storage entity may comprise a file system, logical volume, volume group, or "file system on raw device". The copy of the storage entity is generated using a logical unit number (lun) copying technique in conjunction with a PCPI table of contents (PTOC). The PTOC contains data describing contents of the PCPI, including luns of the storage entity. The PTOC is written to the volume of the storage system, which is configured to store the luns, i.e., in the context of an active file system, immediately prior to generation of the PCPI. After generation of the PCPI, the PTOC is deleted from the volume such that it is only stored within the PCPI and not within the active file system.

To create and access a copy of a host-accessible storage entity, a user issues a command, e.g., a connect command, to one or more modules executing on a client via, e.g., a command line interface (CLI) of the client. According to an aspect of the invention, the connect command specifies the storage entity within the PCPI that is to be copied, as well as a location (e.g., host) to which the PCPI copy is to be exported (i.e., connected). In response to issuance of the command, a PCPI management module locates the luns underlying the storage entity and creates a copy of the luns using the lun copying technique. The PCPI management module then connects the copy of the luns to the specified host. Thereafter, the PCPI management module reconstructs the storage entity, using the copy of the luns, and from information in the PTOC.

In accordance with another aspect of the invention, the user may specify a new name to be used either for the reconstructed storage entity, or for some level of the storage hierarchy supporting the entity. For example, if the reconstructed entity is a host volume, the user may specify a name for either the host volume, its containing volume group, or both.

In accordance with another aspect of the invention, CLI optimizations are provided that reduce (minimize) the amount of information provided by the user when issuing the connect command. For instance, an autoexpand option of the connect command is provided that obviates the need for the user to identify each component of the storage entity to be copied and/or accessed. To that end, the user need only identify a single component of the storage entity when issuing the command. A component of the storage entity may be a logical volume, volume group, or file system, but may also be a lun, directory tree, and other similar data structure. In response, a PTOC program module of the client scans entries of the PTOC searching for a list of components associated with the storage entity. Upon locating the list entry, the program module compares the identified list with the list in the PCPI and, if a match arises, automatically expands the command to include all components of the storage entity.

In addition, an autorename option of the connect command is provided that generates a new, unused name for the copy of the host-accessible storage entity if a name has not been specified. The autorename option illustratively instructs the PCPI management module to select the name based on a set of predetermined rules for internally generating names. For example, names are internally generated based on a "lowest-level" name that identifies the host-accessible storage entity that a user may specify. The lowest-level name may be a volume group name or the rightmost directory in a file system mount point. The PCPI management module then adds a suffix to the lowest-level name based on the type of storage entity. If the generated name is in use, the PCPI management module may add a number to the name to produce a unique, unused name. Furthermore, the autorename option may imply the autoexpand option.

In accordance with another aspect of the invention, a safeguard is provided to avoid performing connect operations that could result in one form of incorrect behavior by volume managers. In more detail, volume managers identify volume groups under their control with unique IDs. These IDs appear in the luns that comprise a volume group. When two volume groups with the same ID (such as an original volume group and its reconstituted copy) are connected to a single host at the same time, an ID conflict results. If not resolved, this conflict can result in erroneous volume manager behavior. On behalf of volume managers that cannot sense such conflicts, this safeguard detects if an operation will result in a conflict, and does not perform the operation if it will result in a conflict.

In accordance with yet another aspect of the invention, a disconnect command may be provided that disconnects the copy of the host-accessible storage entity. In response to issuance of the disconnect command, the PCPI management module attempts to delete the copy of the storage entity created by the connect command. Illustratively, the disconnect command allows deletion of only empty storage entities. Deletion of a host-accessible storage entity that contains one or more luns or volumes requires the use of a -full option to disconnect the entire entity.

BRIEF DESCRIPTION OF THE DRAWINGS

The above and further advantages of invention may be better understood by referring to the following description in conjunction with the accompanying drawings in which like reference numerals indicate identical or functionally similar elements:

FIG. 8 is a schematic block diagram of an exemplary PCPI table of contents in accordance with an embodiment of the present invention;

DETAILED DESCRIPTION

A. Network Environment

Figure 1:
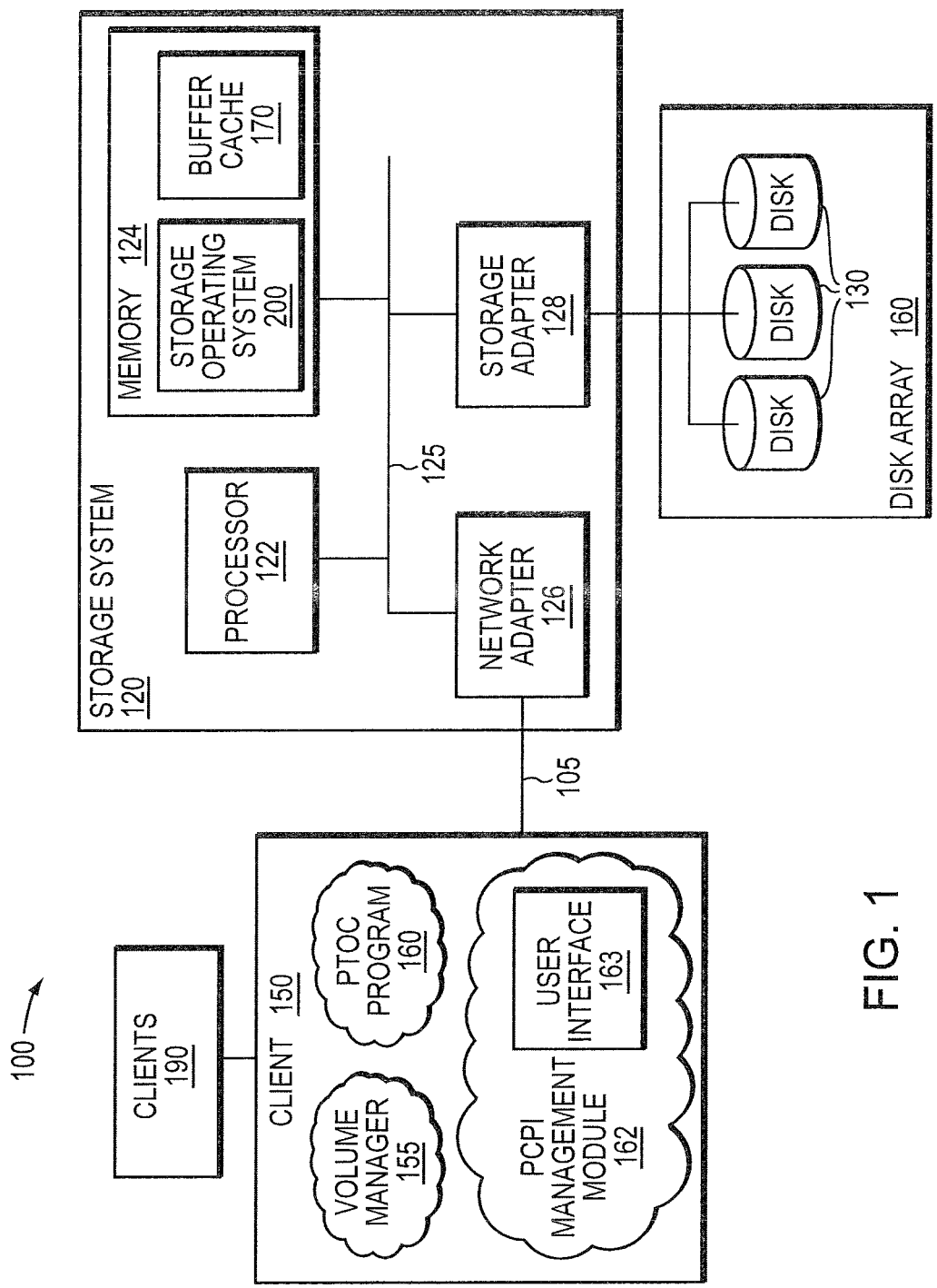
FIG. 1 is a schematic block diagram of an exemplary network environment in accordance with an embodiment of the present invention.

FIG. 1 is a schematic block diagram of an environment 100 including a storage system 120 that may be advantageously used with the present invention. The storage system is illustratively a computer that provides storage service relating to the organization of information on storage devices, such as disks 130 of a disk array 160. The storage system 120 comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of data containers, such as directories, files and special types of files called virtual disks (hereinafter "blocks") on the disks.

In the illustrative embodiment, the memory 124 comprises storage locations that are addressable by the processor and adapters for storing software program code. A portion of the memory may be further organized as a "buffer cache" 170 for storing certain data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the inventive technique described herein.

The network adapter 126 comprises the mechanical, electrical and signaling circuitry needed to connect the storage system 120 to a client 110 over a computer network 105, which may comprise a point-to-point connection or a shared medium, such as a local area network (LAN) or wide area network (WAN). Illustratively, the computer network 105 may be embodied as an Ethernet network or a Fibre Channel (FC) network. The client 150 may communicate with the storage system over network 105 by exchanging discrete frames or packets of data according to pre-defined protocols, such as the Transmission Control Protocol/Internet Protocol (TCP/IP) or SCSI encapsulated in FC (FCP).

The client 150 may be a general-purpose computer configured to execute a volume manager 155. An example of a volume manager 155 that may be advantageously used with the present invention is the Veritas® Volume Manager available from Veritas, Inc. of Mountain View, Calif. It should be noted that the use of the Veritas Volume Manager is exemplary only and that any volume manager may be utilized with the teachings of the present invention. The volume manager 155 organizes data containers exported by the storage system 120 into one or more flexible storage containers for use by other clients 190 of the volume manager 155.

Moreover, the client 150 may interact with the storage system 120 in accordance with a client/server model of information delivery. That is, the client may request the services of the storage system, and the system may return the results of the services requested by the client, by exchanging packets over the network 105. The clients may issue packets including file-based access protocols, such as the Common Internet File System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks. Also included in client 150 is a PTOC program 160 that generates a PCPI table of contents (PTOC), as described further below. Additionally, included in client 150 is a PCPI management module 162 with a user interface 163 adapted to enable a user to enter commands for executing by, e.g., the PCPI management module 162, as described further below. The user interface 163 may be a graphical user interface, or a command line interface (CLI), or other similar interface.

A user entering a command though the user interface 163 of the PCPI management module 162 is just one exemplarily embodiment of the invention. However, in another exemplary embodiment, a software process daemon may execute the PCPI management module 162 upon receiving a request for disaster recovery. Additionally, other triggering events could be conceived for a software process to execute the PCPI management module 162.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array 160. The storage adapter includes input/output (I/O) interface circuitry that couples to the disks over an I/O interconnect arrangement, such as a conventional high-performance, FC serial link topology.

Storage of information on array 160 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

B. Storage Operating System

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configure to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any file system that is otherwise adaptable to the teachings of this invention.

Figure 2:
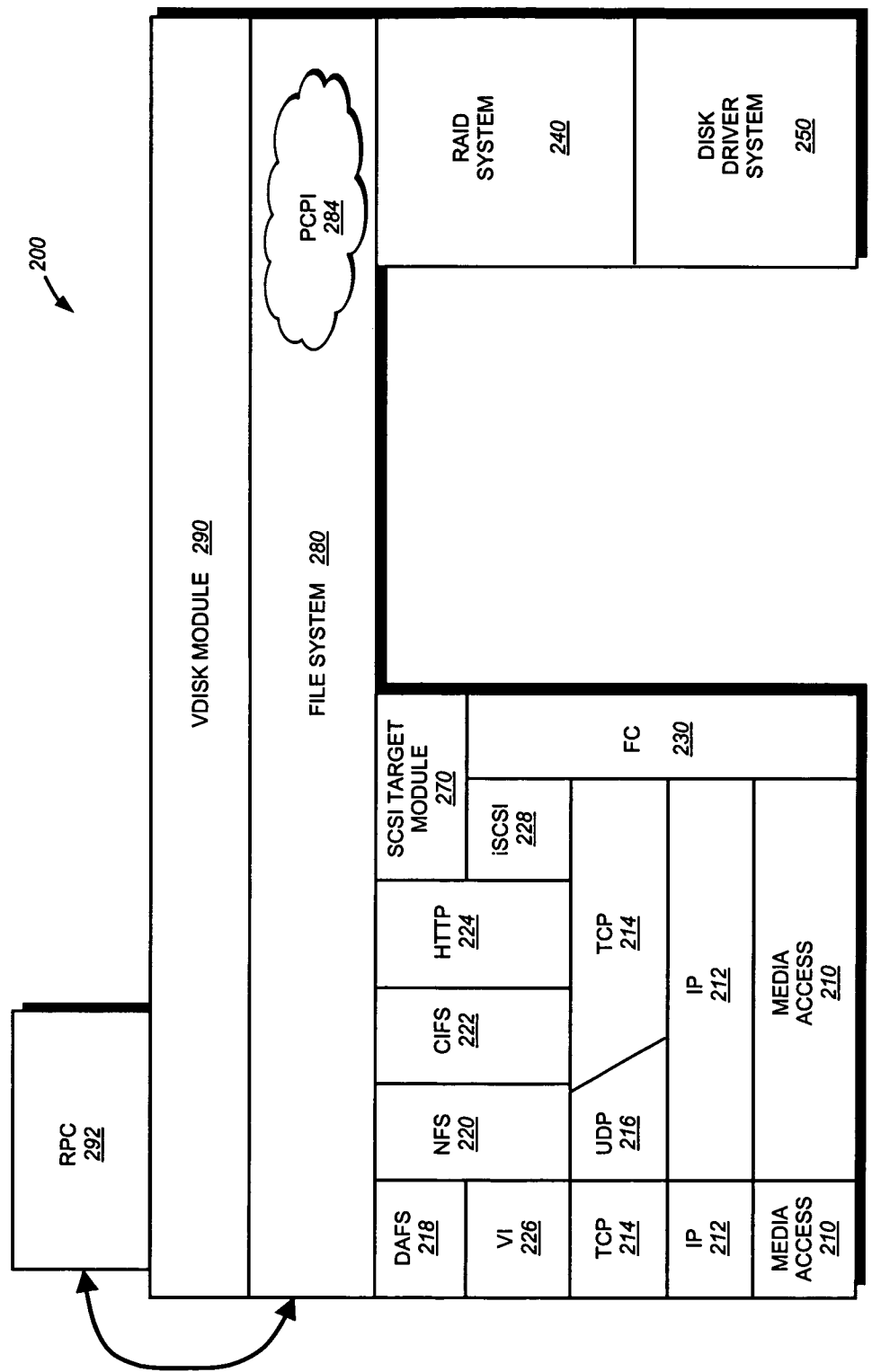
FIG. 2 is a schematic block diagram of an exemplary storage operating system in accordance with an embodiment of the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the root fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file.

A set of persistent consistency point image (PCPI) processes 284 is also associated with file system 280. The PCPI processes 284 enable the file system 280 to generate PCPIs of data containers, as described further below. In alternate embodiments, the functionality of the PCPI processes 284 may be integrated into the file system 280. In addition, a set of remote procedure calls (RPCs) 292 is provided that enable clients of the storage system to invoke various file system functions. For example, the PTOC program 160 executing on client 150 may send a RPC to the RPC module 292 of the storage system 120 to invoke the creation of a PCPI using, e.g., the PCPI function 284 of the file system 280. Another example, the PCPI management module 162 executing on client 150 may send a RPC to the RPC module 292 of the storage system 120 to invoke creation of and access to a copy of a storage entity. Further, in another example, a software process daemon may send a RPC to the RPC module 292 of the storage system 120 to invoke creation and access to a copy of a storage entity, i.e., for disaster recovery.

Operationally, a request from the client 150 is forwarded as a packet over the computer network 105 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in core", i.e., in the buffer cache 170. If the information is not in the cache, the file system 280 indexes into the inode file using the inode number to access an appropriate entry and retrieve a logical vbn. The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 150 over the network 105.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 150. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 120. An example of a multi-protocol storage appliance that may be advantageously used with the present invention is described in previously mentioned U.S. patent application Ser. No. 10/215,917 titled MULTI-PROTOCOL STORAGE APPLIANCE THAT PROVIDES INTEGRATED SUPPORT FOR FILE AND BLOCK ACCESS PROTOCOLS, filed on Aug. 8, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configure to perform a storage function and associated with other equipment or systems.

C. File System Organization

Figure 3:
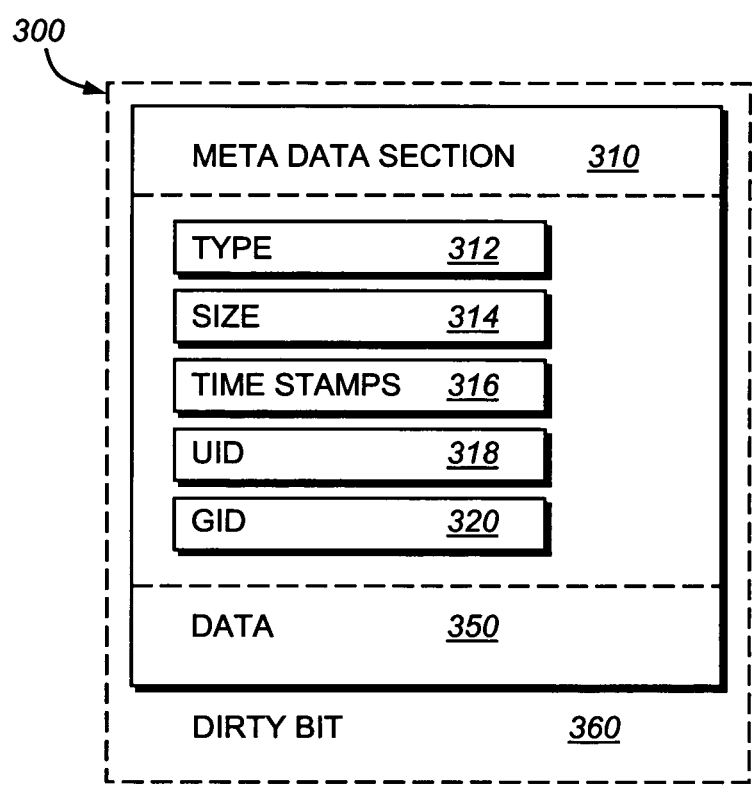
FIG. 3 is a schematic block diagram of an exemplary inode of data structure in accordance with an embodiment of the present invention.

In the illustrative embodiment, a file is represented in the write-anywhere file system as an inode data structure adapted for storage on the disks 130. FIG. 3 is a schematic block diagram of an inode 300, which preferably includes a metadata section 310 and a data section 350. The information stored in the metadata section 310 of each inode 300 describes the file and, as such, includes the type (e.g., regular, directory, virtual disk) 312 of file, the size 314 of the file, time stamps (e.g., access and/or modification) 316 for the file and ownership, i.e., user identifier (UID 318) and group ID (GID 320), of the file. The contents of the data section 350 of each inode, however, may be interpreted differently depending upon the type of file (inode) defined within the type field 312. For example, the data section 350 of a directory inode contains metadata controlled by the file system, whereas the data section of a regular inode contains file system data. In this latter case, the data section 350 includes a representation of the data associated with the file.

Specifically, the data section 350 of a regular on-disk inode may include file system data or pointers, the latter referencing 4 kilobyte (KB) data blocks on disk used to store the file system data. Each pointer is preferably a logical vbn to facilitate efficiency among the file system and the RAID system 240 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 350 of the inode (e.g., a second level inode) references an indirect block (e.g., a first level block) that contains 1024 pointers, each of which references a 4 KB data block on disk. For file system data having a size greater than 64 MB, each pointer in the data section 350 of the inode (e.g., a third level inode) references a double-indirect block (e.g., a second level block) that contains 1024 pointers, each referencing an indirect (e.g., a first level) block. The indirect block, in turn, that contains 1024 pointers, each of which references a 4 KB data block on disk. When accessing a file, each block of the file may be loaded from disk 130 into the buffer cache 170.

When an on-disk inode (or block) is loaded from disk 130 into buffer cache 170, its corresponding in core structure embeds the on-disk structure. For example, the dotted line surrounding the inode 300 (FIG. 3) indicates the in core representation of the on-disk inode structure. The in core structure is a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data is marked "dirty" using the dirty bit 360 so that the inode (block) can be subsequently "flushed" (stored) to disk. The in core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 4:
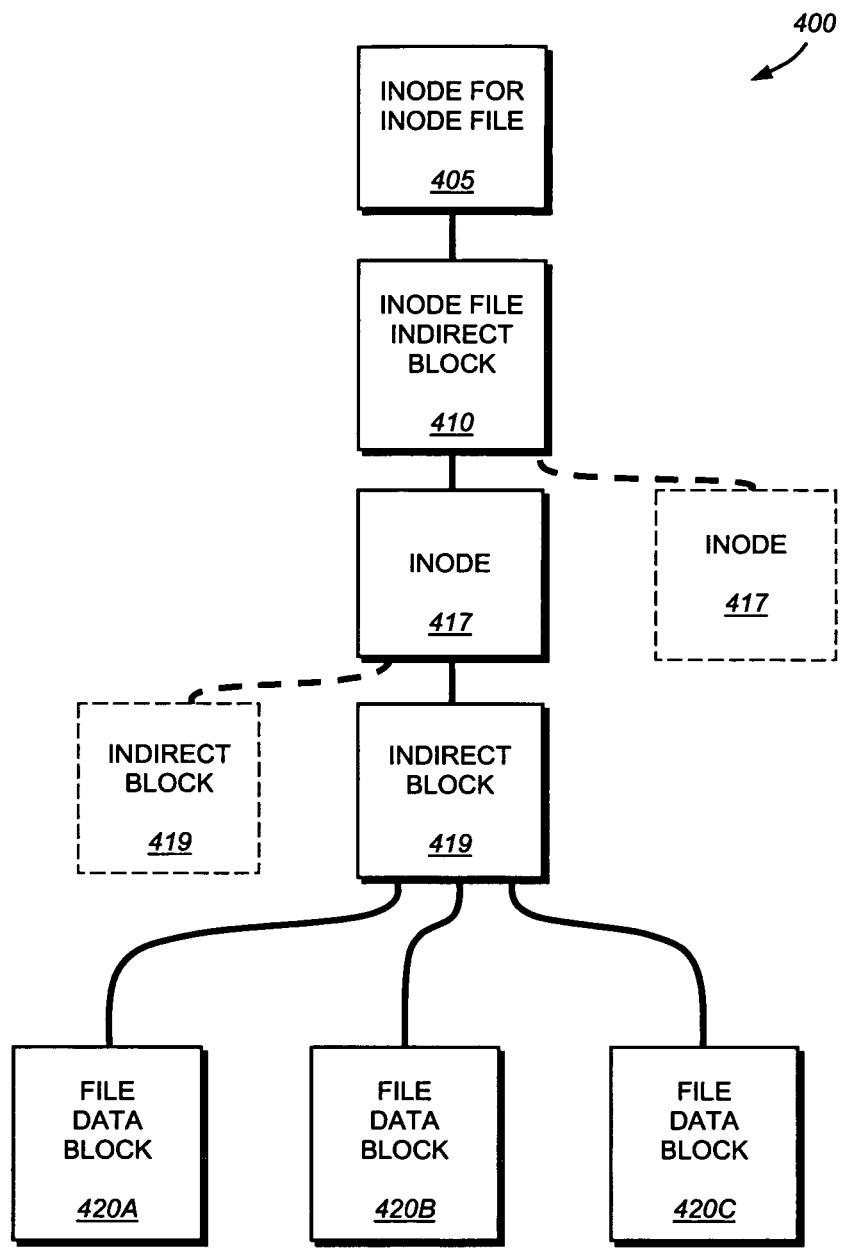
FIG. 4 is a schematic block diagram of an exemplary inode data structure in accordance with an embodiment of the present invention.

A PCPI is a point-in-time representation of a data container stored on one or more storage devices or in other persistent memory. PCPIs are generally created on some regular user-defined schedule; however, the PCPIs also could be created based on an event or a set time period in other embodiments. In one embodiment, the PCPI is stored on-disk along with the active file system, and is called into buffer cache 170 of the storage system memory 124 as requested by the storage operating system 200. An exemplary file system inode structure 400 is shown in FIG. 4. The inode for an inode file 405 contains information describing the inode file associated with a given file system. In this exemplary file system inode structure the inode for the inode file 405 contains a pointer to an inode file indirect block 410. The inode file indirect block 410 contains a set of pointers to Mode blocks, each typically containing multiple Modes 417, which in turn contain pointers to indirect blocks 419. The indirect blocks 419 include pointers to file data blocks 420A, 420B and 420C. Each of the file data blocks 420(A-C) is capable of storing, in the illustrative embodiment, 4 kilobytes (KB) of data.

Figure 5:
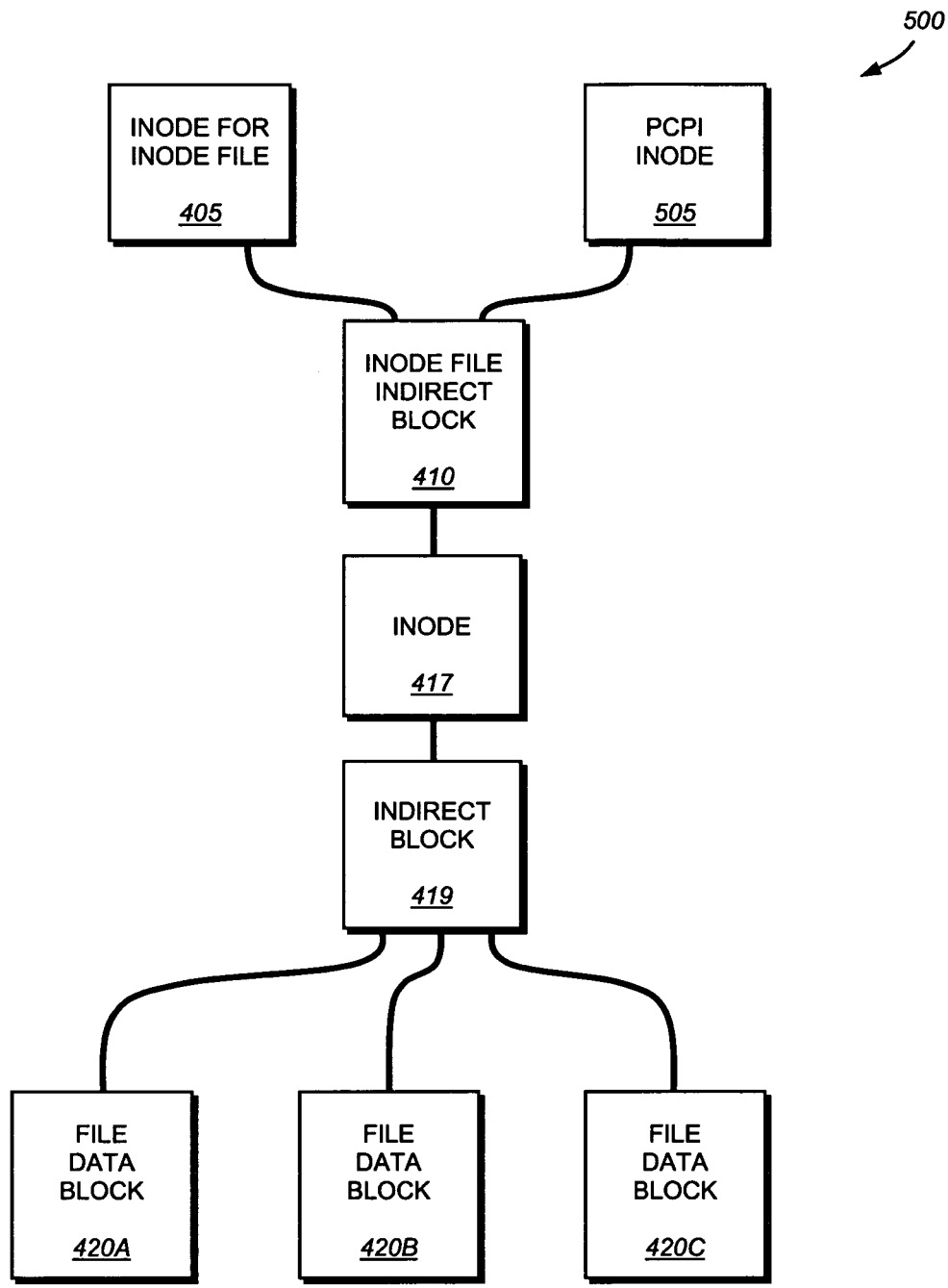
FIG. 5 is a schematic block diagram of an exemplary inode data structure showing a PCPI root inode in accordance with an embodiment of the present invention.

When the file system generates a PCPI of a given file system, a PCPI Mode is generated as shown in FIG. 5. The PCPI Mode 505 is, in essence, a duplicate copy of the Mode for the Mode file 405 of the file system 400. Thus, the exemplary file system structure 400 includes the Mode file indirect blocks 410, Modes 417, indirect blocks 419 and file data blocks 420A-C as in FIG. 4. When a user modifies a file data block, the file system layer writes the new data block to disk and changes the active file system to point to the newly created block.

Figure 6:
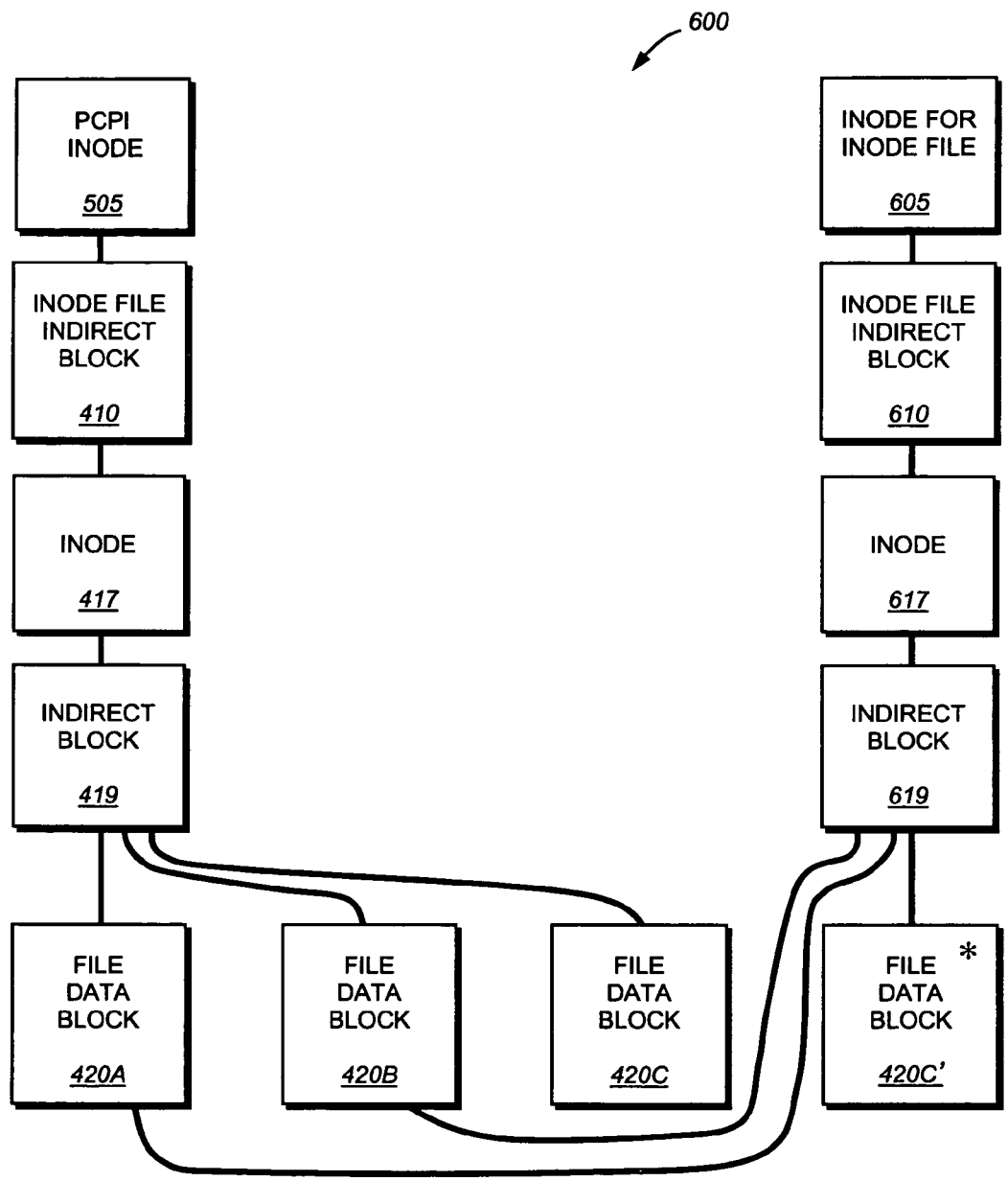
FIG. 6 is a schematic block diagram of an exemplary inode data structure showing a modified data container after a PCPI.

FIG. 6 shows an exemplary Mode file system structure 500 after a file data block has been modified. In this illustrative example, file data block 420C was modified to file data block 420C'. When file data block 420C is modified to file data block 420C', the contents of the modified file data block are written to a new location on disk as a function of the exemplary WAFL file system. Because of this new location, the indirect block 619 is rewritten. Due to this changed indirect block 619, the Mode 617 is rewritten. Similarly, the inode file indirect block 610 and the Mode for the Mode file 605 is rewritten. Thus, after a file data block has been modified the PCPI Mode 505 contains a pointer to the original Mode file indirect block 410 which in turn contains pointers through the Mode 417 and an indirect block 419 to the original file data blocks 220A, 420B and 420C. However, the newly written indirect block 619 includes pointers to unmodified file data blocks 420A and 420B. The indirect block 619 also contains a pointer to the modified file data block 420C' representing the new arrangement of the active file system. A new Mode for the Mode file 605 is established representing the new structure 600. Note that metadata (not shown) stored in any PCPIed blocks (e.g., 505, 410, and 420C) protects these blocks from being recycled or overwritten until they are released from all PCPIs. Thus, while the active file system Mode for the Mode file 605 points to new blocks 420A, 420B and 420C', the old blocks 410, 417, 419 and 420C are retained until the PCPI is fully released.

After a PCPI has been created and file data blocks modified, the file system 280 can reconstruct or "restore" the file system inode structure as it existed at the time of the PCPI by accessing the PCPI inode. By following the pointers contained in the PCPI inode 505 through the inode file indirect block 410, inode 417 and indirect block 419 to the unmodified file data blocks 420A-C, the file system 280 can reconstruct the state of the file system as it existed at the time of creation of the PCPI.

Figure 7:
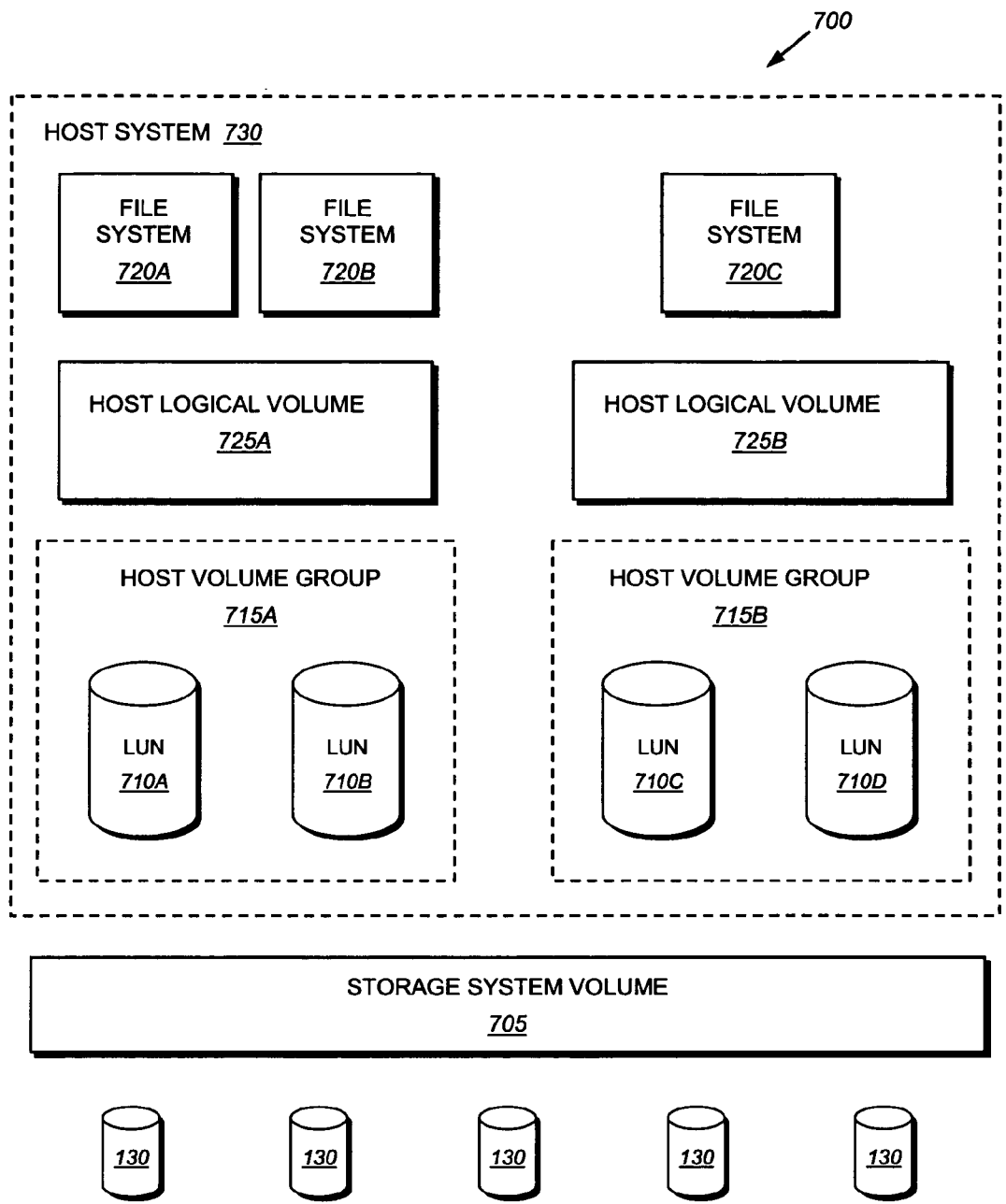
FIG. 7 is a schematic block diagram of showing file systems overlaid onto a volume group comprising one or more luns in accordance with embodiment of the present invention.

FIG. 7 is a schematic block diagram of an exemplary environment 700 showing a number of file systems overlaid onto logical volumes existing within volume groups in accordance with an embodiment of the present invention. At the base of the environment 700 are the disks 130 associated with a particular storage system. Overlaid onto the disks 130 is a storage system volume 705. The volume 705 includes a number of luns 710A-D, which may be exported by the storage system. In the illustrative environment 700 a plurality of volume groups 715 are maintained and managed by volume manager 155 executing on client 150 of the storage system 120. The first volume group 715A comprises luns 710 A, B, whereas the second volume group 715B comprises luns 710 C, D. The volume manager, in conjunction with the operating system of the client, overlays a number of file systems onto logical volumes defined within the volume groups 715. File systems do not need to be overlaid onto the logical volumes, instead a host may access the logical volume as a region of raw data storage. In environment 700, file system 720A, B are overlaid onto host logical volume 725A within volume group 715A. Similarly, a single file system 720C is overlaid onto host logical volumes 725B within volume group 715B. As noted above, the volume manager aggregates a number of luns into a single volume group, which provides a storage space (a flexible storage container) to be utilized by one or more file systems. One aspect of the invention is directed to enabling the creation of a PCPI of the storage system's volume 705 to assist in recovery of the luns comprising a volume group along with the associated configuration and metadata to enable the volume manager to store the volume group and associated file systems once the PCPI is restored.

D. PCPI Table of Contents

In the illustrative embodiment, a PCPI table of contents (PTOC) is generated and written to a volume of a storage system configured to store luns of a volume group (i.e. in the content of an active file system) immediately prior to the generation of a PCPI of the volume. Once the PCPI has been generated, the PTOC is deleted from the volume, but is retained within the PCPI. Thus, when the PCPI is restored, the appropriate configuration metadata may be retrieved from the PTOC to be used in reconfiguring a volume manager of a storage system. Illustratively, PTOC program 160 executing on client computer 150 along with the volume manager 155 gathers the PTOC data by, for example, querying the volume manager using conventional techniques, such as application program interfaces (APIs) or command line interfaces (CLI) invocations, either locally or via remote procedure calls (RPC). The program then writes the PTOC data to a data container within the storage system volume storing the luns comprising the client volume group. Thereafter, a PCPI is generated of the storage system volume. Once the PCPI has been created, the PTOC may be deleted, thereby leaving a PCPI containing the PTOC, i.e., a self-describing data container.

The PTOC is illustratively embodied as an extensible markup language (XML) file comprising of a plurality of sections including, for example, a general information section, a disk group section which, in turn, comprises a lun information section, a host volume section comprising a file system section and a raw disk information section comprising of a file system section and a lun information section. In the exemplary embodiment, a particular PTOC may include multiple disk group, host volume, file system or raw disk sections.

FIG. 8 schematic block diagram of an exemplary PTOC data structure 800 that may be advantageously used with the invention. In the illustrative embodiment, the PTOC comprises a plurality of sections including a general information section 802, a volume group section 804 and a raw disk section 806. The PTOC data structure 800 may include more than one volume group and raw disk sections. In alternate embodiments, the PTOC 800 may have additional fields 870.

The PTOC 800 illustratively includes a table of contents version field 810, a PTOC program field 812, a PCPI name field 813 and a PCPI timestamp field 814. The PTOC version field 810 contains the version of the table of contents. In the illustrative embodiment, differing versions of the table of contents may include different values or formats. Thus, by examining the PTOC version field 810, a determination may be made of the other field's formats within the table of contents. The PTOC program field 812 contains the version of the PTOC program 160 utilized to generate the PTOC 800. The PCPI name field 813 identifies the name of the PCPI associated with the PTOC. The PCPI timestamp field 814 contains the date and/or time when the PCPI was created. Thus, the PTOC version field 810 and the PTOC program field 812 may be utilized by the PTOC program 160 when restoring the corresponding PCPI to determine how to interpret the various fields of the PTOC. For example, the PTOC program 160 and/or the PTOC data structure 800 may embody different versions having different functionalities or capabilities. By storing the version information in the PTOC data structure 800, the PTOC program restoring a PCPI will be able to correctly interpret the contents of the PTOC.

A general information section 802 illustratively includes a host name (i.e., client name) field 816, an operating system type field 818, an operating system version field 820 and operating system release field 820. The host name field 816 includes the name of the host (client 450) including a domain name. The operating system type and version and release fields 818, 820, 822 identify the type of the operating system executing on the client along with the version and release of the operating system. The data stored in the general information section 802 generally identifies the various versions of software executing on a client 150 so that during a PCPI restore operation the PTOC program 160 can interpret properly the data stored in the PCPI.

A volume group section 804 illustratively includes a volume manager name field 824, a volume manager version field 826, a volume group name field 828, a volume group identifier field 830, a lun list field 832, a host volume section 836 and a file system section 840. The volume manager name field 824 identifies the volume manager (e.g., Veritas) being utilized while the volume manager version field 826 identifies the version of the volume manager in use. The volume group name field 828 contains the name of the volume group related to the current PCPI. The lun list field 832 field contains a list of all luns used to create the volume group. As a PCPI is taken at the volume level of the storage system, there may be luns within the volume that are not associated with the volume group and/or storage space. On the client the PCPI is taken after stopping input/output operations to the luns comprising the volume group to ensure that the luns are consistent at the time of the PCPI. Thus, only those luns listed in this field are consistent from the point of view of the client, even though the PCPI may contain other luns within the storage system's volume. The volume group configuration field 834 contains various configuration metadata related to the volume group.

A host volume section 836 illustratively includes a host volume name field 838 and a file system section 840 that describes the file system, if one exists, for the host volume. The host volume name field 838 contains the name of a host volume. The file system type field 842 identifies the type of file system overlaid on to the logical volume. This field is typically only utilized if the logical volume type field is set to identify that a file system is overlaid onto the logical volume. The file system mount point field 854 identifies the mount point for the file system.

The raw disk section 806 includes a lun name field 848, a file system section 850 and a lun information section 858. The lun name field 848 identifies the name of the lun. The file system section 850 includes a file system type field 852, a file system mount point field 854 and a file system options field 856. The file system type field 852 identifies the type of file system being utilized. The file system mount point field 854 identifies the mount point of the file system, namely, the location within a logical namespace to which it is mounted. The file system options field 856 identifies various file system options. The lun information section 858 includes a lun name field 860, a lun serial number field 862, a storage system name field 864, a storage system volume name field 866 and a path list field 868. The lun name field 860 identifies the name of the logical unit number, whereas the lun serial number field 862 contains a serial number associated with the lun. The storage system name field 864 identifies the storage system exporting the lun. The storage system volume name field 866 identifies the volume within the storage system containing the lun. The path list field 868 contains multipathing list information.

Figure 9:
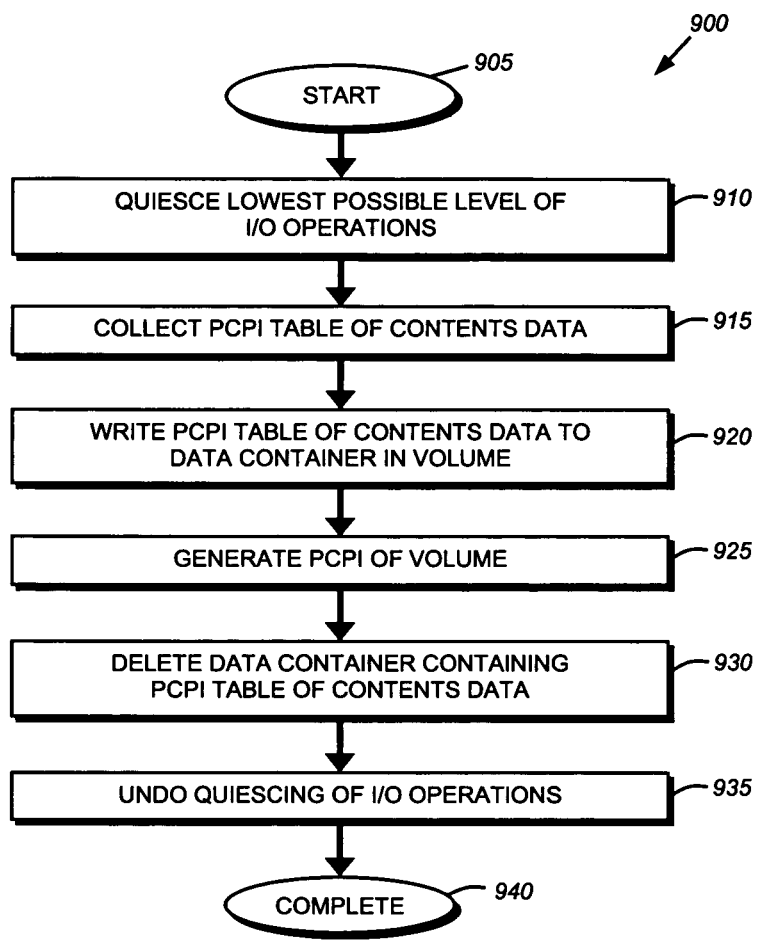
FIG. 9 is a flowchart detailing the steps of a procedure for generating a PCPI table of contents in accordance with an embodiment of the present invention.

FIG. 9 is a flowchart detailing the steps of a procedure 900 for generating a PTOC 800 in accordance with an embodiment of the present invention. The procedure 900 begins at step 905 and continues to step 910 where the PTOC program 160 executing on the client 150 quiesces I/O. This I/O quiescing may include freezing the file systems and/or volume groups which are overlaid on the luns stored within the volume on the storage system. This quiescing may be performed using conventional volume manager commands or, in alternate embodiments, may be executed by utilizing RPCs to volume manager 155 from PTOC program 160. Next, at step 915, the PTOC program 160 collects the appropriate PTOC data by, for example, performing conventional query commands to the volume manager 155 to obtain the necessary data. The PTOC data includes the various data to be written to the PTOC, described above in reference to FIG. 8. Once the data has been collected, the PTOC program then writes the PTOC data to a data container within the volume at step 920. So noted, the PTOC 800 is written as an XML file to the volume. However, in alternate embodiments, the PTOC may be written using alternate forms including, for example, HTML files or be written as an additional lun to the volume.

Once the PTOC data has been written, the PTOC program then generates a PCPI of the volume at step 925. This may be accomplished by, for example, sending a conventional RPC command specifying generation of the PCPI to the storage system. However, it should be noted that in alternate embodiments, other techniques for generating a PCPI may be utilized. Once the PCPI has been generated, the PTOC program 160 deletes the data container containing the PTOC data at step 930. Thus, the PTOC is not visible within the active file system and only resides within the PCPI itself. Once the data container has been deleted, the PTOC program reverses the steps taken to quiesce I/O by, for example, thawing or reviving the file system(s) and/or volume group(s). The procedure then completes at step 940.

As will be noted from the procedure 900 described above, the system and method enables the generation of a PTOC that is written to a volume immediately prior to the generation of a PCPI of the volume. Once the PCPI has been generated, the PTOC data is then deleted from the volume, thereby resulting in the PTOC only appearing within the PCPI and not the active file system. When the PCPI is restored, the PTOC is restored along with the point in time image of the other data stored within the volume. Thus, the PCPI of the volume is a self-describing data container that incorporates the metadata necessary for configuring the volume manager at that particular point in time.

E. Connect and Disconnect Command

The present invention provides a system and method for creating and accessing a copy of one or more host-accessible storage entities contained in a PCPI of a volume served by a storage system. The storage entity may comprise a file system, logical volume, volume group, or "file system on raw device". The copy of the storage entity is generated using a lun copying technique in conjunction with a PTOC. The PTOC contains data describing contents of the PCPI, including luns of the storage entity. The PTOC is written to the volume of the storage system, which is configured to store the luns, i.e., in the context of an active file system, immediately prior to generation of the PCPI. After generation of the PCPI, the PTOC is deleted from the volume such that it is only stored within the PCPI and not within the active file system.

To create and access a copy of a host-accessible storage entity, a user issues a command, e.g., a connect command, to one or more modules executing on a client via, e.g., a CLI of the user interface 163 on client 150. In other embodiments, a software process daemon may initiate the PCPI management module 162 based on a triggering event, i.e., a request for disaster recovery According to an aspect of the invention, the connect command specifies the storage entity within the PCPI that is to be copied, as well as a location (e.g., host) to which the PCPI copy is to be exported (i.e., connected). In response to issuance of the command, a PCPI management module 162 locates the luns underlying the storage entity and creates a copy of the luns using the lun copying technique. The PCPI management module 162 then connects the copy of the luns to the specified host. Thereafter, the PCPI management module reconstructs the storage entity, using the copy of the luns, and from the information in the PTOC.

Figure 10:
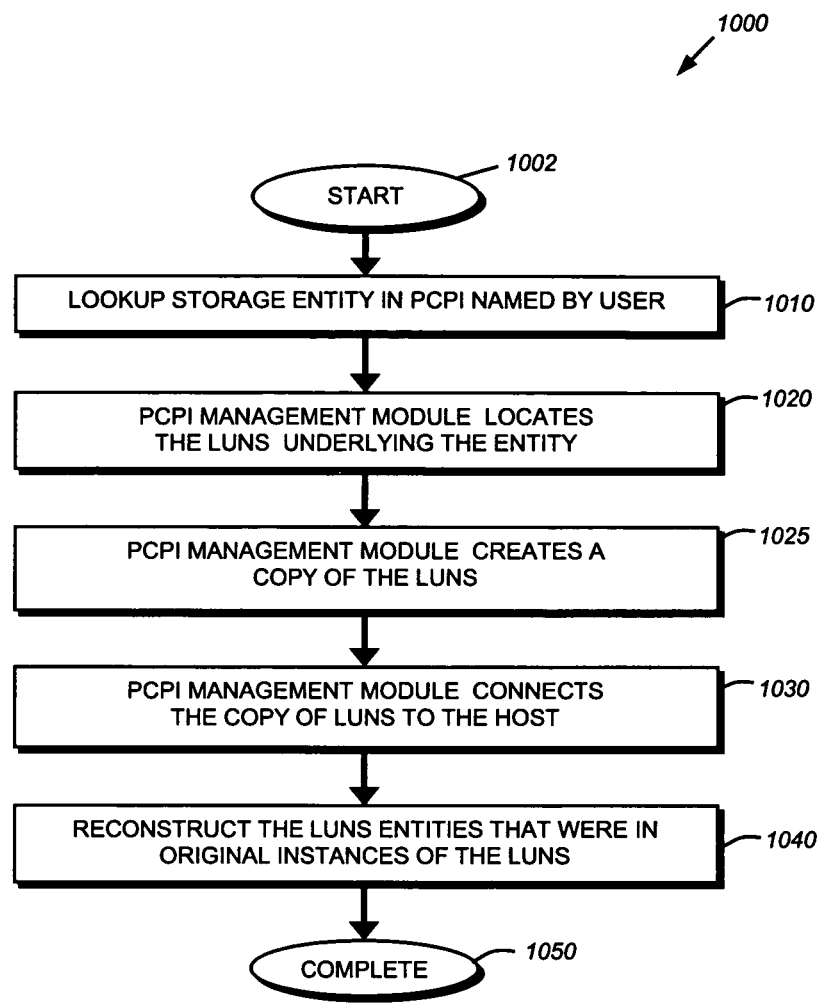
FIG. 10 is a flowchart detailing the steps of a procedure for connecting a copy of a PCPI.

FIG. 10 is a flowchart detailing the steps of a procedure 1000 for connecting a copy of a PCPI with a host either specified by a user through the user interface 163 in accordance with an embodiment of the present invention. In an alternate embodiment, a software process daemon can execute the PCPI management module 162 based on a triggering event, i.e., a request for disaster recovery. The procedure 1000 also details the use of a PCPI management module connect command. The procedure 1000 starts at step 1002, and proceeds to step 1010, where the PCPI management module 162 looks up in the PTOC a storage entity stored in the PCPI named by a user. The PCPI specified by the user can reside in one or more volumes, where the volumes can be on different storage systems. Additionally, the user can specify more than one storage entity on a single command line. Using the CLI of user interface 163, a user inputs a connect command, which for example may take the form of:

PCPI management module connect File spec. set long PCPI name

The file spec. set has the form of:

{storage entity type}source host entity [destination copy] [destination volume group name][destination logical volume name]

The file spec. set names a host-accessible logical entity using one of -vg, -fs, or -lvol to specify the storage entity type followed by source host entity. The source host entity is the name of a single host entity in the PCPI. The file spec. set may also include one or more destination names. The reconstructed storage entity may be named with destination copy name, where the storage entity takes the name of the host. In addition, destination volume group name may be used to specify a name for the volume group that will contain a reconstituted volume group, and destination logical volume name may be used to specify a name for the logical volume and volume group that will contain a reconstituted file system. Finally, a user adds long PCPI name to the command line to name the PCPI containing the original storage entity. Additionally, the long PCPI name specifies the storage system name, volume name, and PCPI name to be used. Alternatively, the PCPI name, system name, and volume name may be determined by the PCPI management module or other program.

Next, at step 1020, PCPI management module 162 locates the luns 710 or data container, underlying the entity using the PTOC. Then, at step 1025, PCPI management module 162 creates a copy of the data container or luns 710. The luns are copied using lun clone create command, which is further described in U.S. patent application Ser. No. 10/772,822, entitled System and Method for Lun Cloning by Vinay Gupta et al., which was published as U.S. Patent Publication No. 2005/0177594 A1 on Aug. 11, 2005, which application is hereby incorporated by reference. A writable vdisk is a "shadow" image of the snapshot file image and, as noted, includes an attribute that specifies the snapshot file as a backing store. It should be noted that while there are any vdisks in existence in the active file system specifying a file in a snapshot, the snapshot file is "locked" and cannot be deleted. A LUN cloning technique "separates" data blocks referenced by a writable vdisk in the active file system from data blocks referenced only by a backing store, thereby removing dependency of the writable vdisk upon the backing store. By separating the data blocks referenced by the writable vdisk, a user may then delete the backing store and free the disk space consumed by the backing store on the storage appliance. Notably, separation of the writable vdisk data blocks from the backing store occurs during periods of reduced processing activity in the file system, e.g., as part of background task processing on the appliance, so that the present technique may be implemented without any downtime visible to a client application served by the appliance. At step 1030, PCPI management module 162 connects the copy of the data container or the copy of the luns to the host by mapping the luns or data container to the host. When connecting the lun or data container the new name of the copy (host name) is either selected by a user or by the PCPI management module 162. When a name is selected by the PCPI management module 162, the name or names are internally generated based on a "lowest-level" name that identifies the host-accessible storage entity that a user may specify. The lowest-level name may be a volume group name or the rightmost directory in a file system mount point. The PCPI management module 162 then adds a suffix to the lowest-level name based on the type of storage entity, i.e. -vg for volume group or -lv for logical volume. If the generated name is in use, the PCPI management module 162 may add a number to the name to produce a unique, new, unused name. Then, at step 1040, reconstruct the storage entities that were in the original instances of the luns or data container using the PTOC 800. In one embodiment, reconstructing includes (i) discovering the luns or data container by the host using the PTOC, (ii) activating the volume group and any host volume on the volume group, and (iii) mounting any file systems in the PCPI on the host volumes. In other embodiment, reconstructing can include activating logical volumes or other storage entities connected to the host. The connecting procedure completes at step 1050.

In alternate embodiment of the invention, the PCPI management module 162 can connect a "file system on raw device" (fs-on-raw). "File system on raw device" refers to a file system created directly on a raw device, e.g., a raw lun. Using the CLI of user interface 163, a user inputs a connect command, which for example may take the form of:

PCPI management module connect -fs source mount [destination mount] long PCPI name The source mount argument specifies the directory at which the desired file system was originally mounted. The destination mount argument, if given, specifies the directory at which the new copy of the file system will be mounted. Additionally, a user uses the long PCPI name to name the PCPI containing the storage entity. The long PCPI name specifies the storage system name, volume name, and the PCPI name to be used.

The PCPI management module 162 looks up the named source mount in the PTOC 800 of the named PCPI. Then, the PCPI management module 162 creates a copy of the lun 710 using the lun clone create command. Next, the PCPI management module 162 locates the lun 710 underlying the file system, using the PTOC 800. After that, the PCPI management module 162 connects the copy of the lun to the host. Finally, the PCPI management module 162 mounts the copy of the file system at its new mount point. The new mount point is either the destination mount or a name derived from the source mount.

In accordance with another aspect of the invention, CLI optimizations are provided that reduce (minimize) the amount of information provided by the user when issuing the connect command. For instance, an autoexpand option of the connect command is provided that obviates the need for the user to identify each component of the storage entity to be copied and/or accessed. To that end, the user need only identify a single component of the storage entity when issuing the command. A component of the storage entity may be a logical volume, volume group, or file system, but may also be a lun, directory tree, and other similar data structure. In response, a PTOC program module 160 of the client 150 scans entries of the PTOC 800 searching for a list of components associated with the storage entity. Upon locating the list entry, the program module compares the identified list with the list in the PCPI and, if a match arises, automatically expands the command to include all components of the storage entity.

In addition, an autorename option of the connect command is provided that generates a new, unused name for the copy of the host-accessible storage entity if a name has not been specified. The autorename option illustratively instructs the PCPI management module 162 to select the name based on a set of predetermined rules for internally generating names. For example, names are internally generated based on a "lowest-level" name that identifies the host-accessible storage entity that a user may specify, e.g. source host entity. The lowest-level name may be a volume group name or the rightmost directory in a file system mount point. The PCPI management module 162 then adds a suffix to the lowest-level name based on the type of storage entity. If the generated name is in use, the PCPI management module 162 may add a number to the name to produce a unique, unused name. Furthermore, the autorename option may imply the autoexpand option.

In accordance with another aspect of the invention, a safeguard is provided to avoid performing connect operations that could result in one form of incorrect behavior by volume managers. In more detail, volume managers identify volume groups under their control with unique IDs. These IDs appear in the luns that comprise a volume group. When two volume groups with the same ID (such as an original volume group and its reconstituted copy) are connected to a single host at the same time, an ID conflict results. If not resolved, this conflict can result in erroneous volume manager behavior. On behalf of volume managers that cannot sense such conflicts, this safeguard detects if an operation will result in a conflict, and does not perform the operation if it will result in a conflict.

In accordance with yet another aspect of the invention, a disconnect command may be provided that disconnects the copy of the host-accessible storage entity. In response to issuance of the disconnect command, the PCPI management module attempts to delete the copy of the storage entity created by the connect command. Illustratively, the disconnect command allows deletion of empty storage entities. Deletion of a host-accessible storage entity that contains one or more luns or volumes requires the use of a -full option to disconnect the entire entity.

Figure 11:
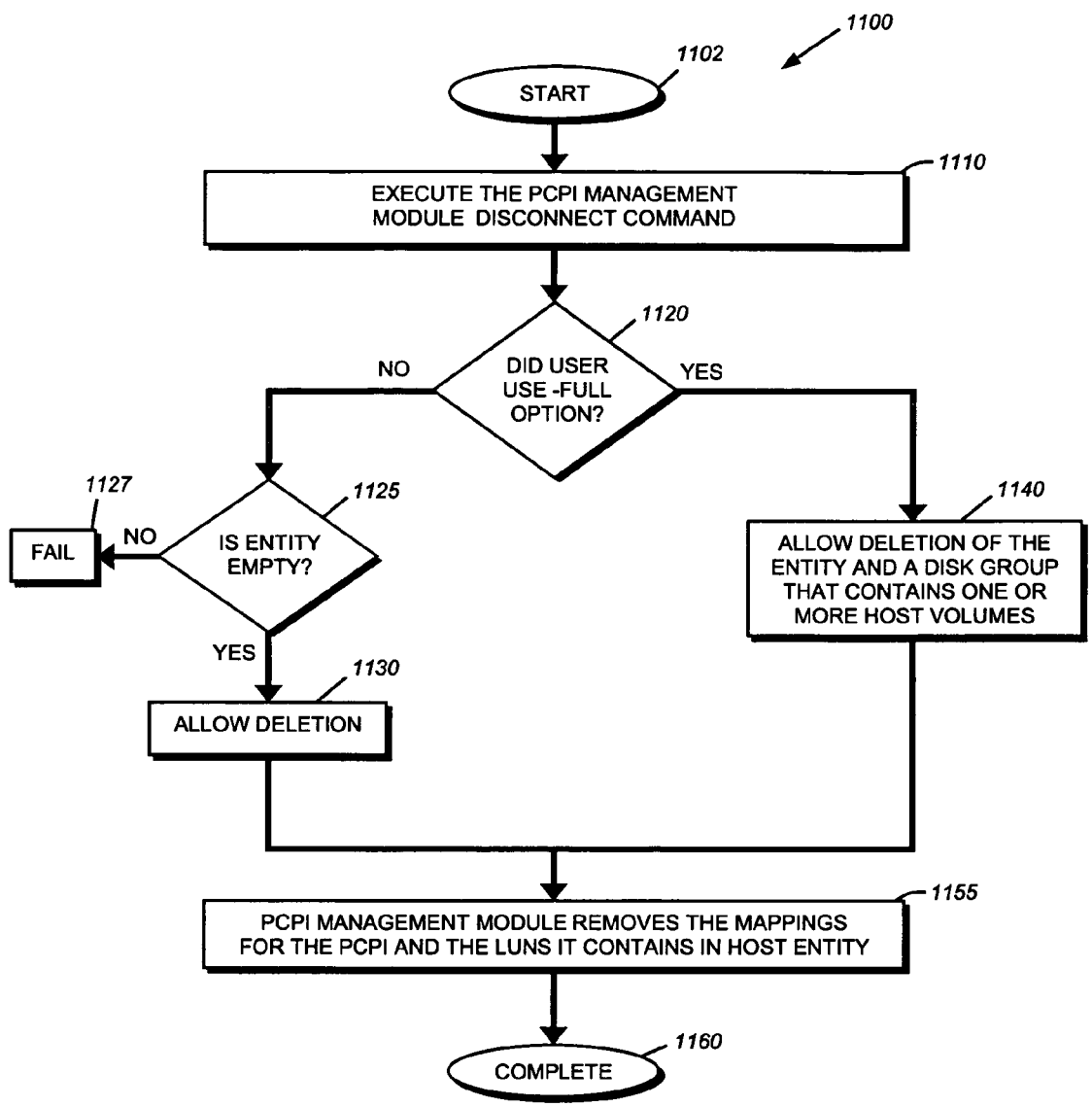
FIG. 11 is a flowchart detailing the steps of an illustrative procedure for disconnecting a host entity.

FIG. 11 is a flowchart detailing the steps of an illustrative procedure 1100 for disconnecting a host entity. The procedure 1100 starts at step 1102, and continues to step 1110, where a user executes a PCPI management module disconnect command specifying the name of an entity or entities to disconnect using a user interface 163. Using the CLI of the user interface 163, a user inputs a disconnect command, which for example may take the form of:

PCPI management module disconnect {file type} file spec

The file type includes a designation for -vg, -lvol, and -fs. The -vg refers to a volume group. The option -lvol refers to a logical volume. The option -fs refers to a file system. The file spec specifies the name of the name of the entity or entities to disconnect. At step 1120, PCPI management module 162 determines if a user entered -full option in the CLI as part of the disconnect command. If the -full is not used, then, at step 1125, the PCPI management module 162 determines if the entity is empty. A storage entity is not empty if for example it contains a disk group with one or more host volumes. If the entity is not empty, then, a failure occurs at step 1127. If the entity is empty, then allow deletion of the entity at step 1130. If the -full option is used, then at step 1140, allow deletion of the entity and/or a disk group that contains one or more host volumes. Next, at step 1155, the PCPI management module 162 removes the mappings for the PCPI and the luns it contains in the host entity. The disconnect procedure completes at step 1160.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for creating and accessing a copy of a storage entity on a storage system, comprising:
    selecting the storage entity to copy from a persistent consistency point image (PCPI), the storage entity including a plurality of data containers underlying the storage entity and a PCPI table of contents (PTOC) describing the plurality of data containers;
    locating the plurality of data containers underlying the storage entity by identifying the plurality of data containers using the PTOC;
    copying the plurality of identified data containers;
    connecting the copy of the plurality of identified data containers to a destination by mapping the copy of the plurality of identified data containers to the destination; and
    reconstructing the storage entity using the PTOC and the copy of the plurality of identified data containers.

2. The method of claim 1, wherein locating further comprises:
    using a procedure to safeguard against enabling an undetected volume group identifier conflict.

3. The method of claim 1, wherein connecting further comprises:
    generating a unique name for the storage entity.

4. The method of claim 1, wherein connecting further comprises:
    using a name specified by a user as the name for the storage entity at the new destination and a component of a storage hierarchy implementing the storage entity.

5. The method of claim 1, wherein selecting comprises entering a command in a command line interface (CLI) to select the PCPI.

6. The method of claim 1, wherein the plurality of data containers comprises one or more logical unit numbers.

7. The method of claim 1, wherein the storage entity comprises one of a file system, a logical volume, a volume group, and a file system on a raw device.

8. The method of claim 1, wherein selecting further comprises:
    entering an auto expand option, wherein the auto expand option allows a user to identify a component of the storage entity; and
    in response, scanning, by a PTOC program module, entries of the PTOC searching for a list of components associated with the storage entity.

9. An apparatus for connecting a copy of a storage entity on a storage system, comprising:
    means for selecting the storage entity to copy from a persistent consistency point image (PCPI), the storage entity including a plurality of data containers underlying the storage entity and a PCPI table of contents (PTOC) describing the plurality of data containers;
    means for locating the plurality of data containers underlying the storage entity by identifying the plurality of data containers using the PTOC;
    means for copying the plurality of identified data containers;
    means for connecting the copy of the plurality of identified data containers to a destination by mapping the copy of the plurality of identified data containers to the destination; and
    means for reconstructing the storage entity using the PTOC and the copy of the plurality of identified data containers.

10. The apparatus of claim 9, wherein the means for locating, further comprises:
    means for using a procedure to safeguard against enabling an undetected volume group identifier conflict.

11. The apparatus of claim 9, wherein the means for connecting, further comprises:
    means for generating a unique name for the storage entity.

12. The apparatus of claim 9, wherein the means for connecting, further comprises:
    means for using a name specified by a user as the name for the storage entity at the destination and a component of a storage hierarchy implementing the storage entity.

13. The apparatus of claim 9, wherein the means for selecting, comprises:
    means for entering a command in a command line interface (CLI) to select the PCPI.

14. The apparatus of claim 9, wherein the plurality of data containers comprises one or more logical unit numbers.

15. The apparatus of claim 9, wherein the storage entity comprises one of a file system, a logical volume, a volume group, and a file system on a raw device.

16. A storage system to access a copy of a storage entity, comprising:
    a processor coupled to a memory;
    a user interface operatively connected to a computer configured to enable selection of the storage entity to copy from a persistent consistency point image (PCPI), the storage entity including a plurality of data containers underlying the storage entity and a PCPI table of contents (PTOC) describing the plurality of data containers; and
    a management module executed by the processor and configured to cooperate with the user interface, the management module configured to,
        locate the plurality of data containers underlying the storage entity by identifying the plurality of data containers using the PTOC,
        copy the plurality of data containers,
        connect the copy of the plurality of data containers to a destination by
    mapping the copy of the plurality of data containers to the destination, and
        reconstruct the storage entity using the PTOC and the copy of the plurality of identified data containers.

17. The system of claim 16, wherein the destination comprises an original host, and wherein the original host is first connected to the storage entity.

18. The system of claim 16, wherein the destination comprises a host.

19. The system of claim 16, wherein the plurality of data containers comprises one or more logical unit numbers.

20. The system of claim 16, wherein the storage entity comprises one of a file system, a logical volume, a volume group, and a file system on a raw device.

21. The storage system of claim 16, wherein the user interface further comprises an auto expand option to identify a component of the storage entity, and wherein the apparatus further comprises a PTOC program module configured to scan one or more entries of the PTOC for a list of components associated with the storage entity.

22. The storage system of claim 16, wherein the plurality of data containers comprises at least one logical unit number.

23. A method for creating and accessing a copy of a storage entity on a storage system, comprising:
- selecting the storage entity to copy from a persistent consistency point image (PCPI), the storage entity including a plurality of logical unit numbers (luns) underlying the storage entity and a PCPI table of contents (PTOC) describing the plurality of luns;
- locating the plurality of luns underlying the storage entity by identifying the plurality of luns using the PTOC;
- copying the plurality of identified luns;
- connecting the copy of the plurality of identified luns to a destination by mapping the copy of the plurality of identified luns to the destination; and
- reconstructing the storage entity using the PTOC and the copy of the plurality of identified luns.

24. The method of claim 23, wherein selecting comprising:
- entering an auto expand option, wherein the auto expand option allows a user to identify a component of the storage entity; and
- in response, scanning, by a PTOC program module, entries of the PTOC searching for a list of components associated with the storage entity.

25. The method of claim 23, wherein connecting further comprises:
- generating a new unique name for the storage entity.

26. The method of claim 23, wherein the storage entity comprises one of a file system, a logical volume, a volume group, and a file system on a raw device.

27. A non-transitory computer readable storage medium containing executable program instructions executed by a processor, comprising:
- program instructions that select a storage entity to copy from a persistent consistency point image (PCPI), the storage entity including a plurality of data containers underlying the storage entity and a PCPI table of contents (PTOC) describing the plurality of data containers;
- program instructions that locate the plurality of data containers underlying the storage entity by identifying the plurality of data containers using the PTOC;
- program instructions that copy the plurality of identified data containers;
- program instructions that export the copy of the plurality of identified data containers to a destination by mapping the copy of the plurality of identified data containers to the destination; and
- program instructions that reconstruct the storage entity using the PTOC and the copy of the plurality of identified data containers.

28. The non-transitory computer readable storage medium of claim 27, wherein the storage entity comprises one of a file system, a logical volume, a volume group, and a file system on a raw device.

29. The non-transitory computer readable storage medium of claim 27, wherein the program instructions that select comprise:
- program instructions that identify a component of the storage entity; and
- program instructions that, in response to identifying the component, scan one or more entries of the PTOC for a list of components associated with the storage entity.

30. The non-transitory computer readable storage medium of claim 27, further comprising:
- program instructions that generate a unique name for the storage entity.

31. The non-transitory computer readable storage medium of claim 27, further comprising:
- program instructions that use a name specified by a user as the name for the storage entity for the storage entity of the destination and a component of a storage hierarchy implementing the storage entity.

32. The non-transitory computer readable storage medium of claim 27, wherein the plurality of data containers comprises at least one logical unit number.

33. A method for creating and accessing a copy of a storage entity on a storage system, comprising:
- processor operatively connected to the storage system configured to execute a storage operating system, the storage operating system configured to copy a storage entity selected by a computer operatively connected to the storage system, the storage entity to be copied from a persistent consistency point image (PCPI) stored at the storage system, the storage entity including a plurality of data containers underlying the storage entity and a PCPI table of contents (PTOC) describing the plurality of data containers; and
- a management module of the storage operating system configured to cooperate with the computer to,
    - locate the plurality of data containers underlying the storage entity by identifying the plurality of data containers using the PTOC,
    - copy the plurality of data containers,
    - connect the copy of the plurality of data containers to a destination by mapping the copy of the plurality of data containers to the destination, and
    - reconstruct the storage entity using the PTOC and the copy of the plurality of identified data containers.

* * * * *

UNITED STATES PATENT AND TRADEMARK OFFICE
CERTIFICATE OF CORRECTION

| | | |
|---|---|---|
| PATENT NO. | : 9,026,495 B1 | Page 1 of 1 |
| APPLICATION NO. | : 11/442437 | |
| DATED | : May 5, 2015 | |
| INVENTOR(S) | : Arthur F. Lent | |

It is certified that error appears in the above-identified patent and that said Letters Patent is hereby corrected as shown below:

In the Specification:
Col. 11, lines 32-33 should read:
contains a set of pointers to inode blocks, each typically
containing multiple inodes 417, which in turn contain point- Col. 11, lines 39-43 should read:
system, a PCPI inode is generated as shown in FIG. 5.
The PCPI inode 505 is, in essence, a duplicate copy of the inode
for the inode file 405 of the file system 400. Thus, the exemplary
file system structure 400 includes the inode file indirect blocks
410, inodes 417, indirect blocks 419 and file data Col. 11, line 48 should read:
FIG. 6 shows an exemplary inode file system structure 500

Signed and Sealed this
Twenty-ninth Day of September, 2015

Michelle K. Lee
*Director of the United States Patent and Trademark Office*